(12) United States Patent
Reichard

(10) Patent No.: US 9,239,573 B2
(45) Date of Patent: Jan. 19, 2016

(54) MAPPING BETWEEN HIERARCHIES IN AN INDUSTRIAL AUTOMATION SYSTEM

(71) Applicant: Rockwell Automation Technologies, Inc., Mayfield Heights, OH (US)

(72) Inventor: Douglas J. Reichard, Fairview Park, OH (US)

(73) Assignee: ROCKWELL AUTOMATION TECHNOLOGIES, INC., Mayfield Heights, OH (US)

( * ) Notice: Subject to any disclaimer, the term of this patent is extended or adjusted under 35 U.S.C. 154(b) by 287 days.

(21) Appl. No.: 13/863,166

(22) Filed: Apr. 15, 2013

(65) Prior Publication Data

US 2013/0275908 A1 Oct. 17, 2013

Related U.S. Application Data

(60) Provisional application No. 61/624,833, filed on Apr. 16, 2012.

(51) Int. Cl.
*G06F 15/00* (2006.01)
*G06F 13/00* (2006.01)
*G05B 15/02* (2006.01)
*G06F 3/0481* (2013.01)
*G06F 17/30* (2006.01)
*G06F 9/44* (2006.01)

(52) U.S. Cl.
CPC ............ *G05B 15/02* (2013.01); *G06F 3/0481* (2013.01); *G06F 9/4443* (2013.01); *G06F 17/30327* (2013.01)

(58) Field of Classification Search
CPC ............................. G05B 19/054; G05B 19/408
USPC ......... 715/769, 805, 804, 810, 809, 808, 771, 715/811, 767
See application file for complete search history.

(56) References Cited

U.S. PATENT DOCUMENTS

| 7,165,226 B2 * | 1/2007 | Thurner et al. ............... 715/767 |
| 7,337,409 B2 * | 2/2008 | Doblmayr et al. ............ 715/769 |
| 7,526,794 B2 * | 4/2009 | Chand et al. ...................... 726/2 |
| 2003/0028269 A1 | 2/2003 | Spriggs et al. |
| 2003/0132962 A1 | 7/2003 | Santori et al. |
| 2006/0004785 A1 | 1/2006 | Hinegardner et al. |
| 2006/0236328 A1 | 10/2006 | DeWitt |

(Continued)

OTHER PUBLICATIONS

Office Action for U.S. Appl. No. 13/863,192, dated Jul. 23, 2015, 38 pages.

(Continued)

*Primary Examiner* — Kevin Nguyen
(74) *Attorney, Agent, or Firm* — Amin, Turocy & Watson, LLP

(57) ABSTRACT

A mechanism for mapping data between different hierarchies within an industrial automation system facilitates the user of the different hierarchies. For example, the mechanism can include at least: locating an instance of data within a first hierarchical tree; and mapping the instance of the data within the first hierarchical tree to an instance of the data within a second hierarchical tree. The first hierarchical tree and the second hierarchical tree include instances of the same data arranged in different structural organizations. Utilizing the mechanism, when an instance of data in the first hierarchical tree is changed, a corresponding instance of the data in the second hierarchical tree can be updated according to the change.

20 Claims, 16 Drawing Sheets

(56) References Cited

U.S. PATENT DOCUMENTS

2008/0163104 A1    7/2008   Haug
2009/0222513 A1    9/2009   Sallberg
2011/0258568 A1   10/2011   Pandurangan et al.

OTHER PUBLICATIONS

Final Office Action dated Nov. 10, 2015 for U.S. Appl. No. 13/863,192, 42 pages.

* cited by examiner

MAPPING BETWEEN HIERARCHIES IN AN INDUSTRIAL AUTOMATION SYSTEM

CROSS REFERENCE TO RELATED CASES

This application claims priority to U.S. provisional application No. 61/624,833, filed on Apr. 16, 2012, entitled "CONTROL AND VISUALIZATION SYSTEM DESIGN EDITOR WITH ENHANCED VISUALIZATION MODES." Additionally, this application is related to concurrently filed U.S. application Ser. No. 13/863,192, filed Apr. 15, 2013, entitled "MULTIPLE APPLICATIONS UTILIZED IN AN INDUSTRIAL AUTOMATION SYSTEM DISPLAYED AS A SINGLE APPLICATION". The entireties of these two applications are incorporated herein by reference.

TECHNICAL FIELD

This disclosure generally relates to a mechanism to map between different hierarchies storing instances of the same data within different structural organizations.

BACKGROUND

Industrial automation generally refers to the use of control systems to increase the productivity and/or quality of an industrial process. An "industrial process" generally refers to any type of process that facilitates the production of goods or the delivery of services. A "control system" generally refers to a device or set of devices that manage, command, direct, or regulate the behavior of other devices utilized within an industrial process. The "control system" can be managed by an "industrial controller," such as a programmable logic controller, a programmable automation controller, or the like.

Data related to a control system is generally stored according to various structural organizations. For example, instances of the data can be stored according to different hierarchies (corresponding to different hierarchical trees). Each different hierarchical tree arranges data in a different manner. Hierarchies and other structural organizations are necessary to provide a high level view of relationships between content, including the data, within the control system and to facilitate navigation through the content to reach the data for manipulation.

Control systems utilize different hierarchies to arrange content, including a logical hierarchy, a physical hierarchy, a control hierarchy and a network hierarchy, among other hierarchies. To accommodate any conceivable situation, developers of control systems keep adding additional hierarchies that may be needed by a user in different situations. While the different hierarchies are necessary to accommodate all conceivable situations, the average user is often confused by the many different hierarchies.

The above-described background is merely intended to provide an overview of contextual information regarding different structural organizations that can be used to store data related to control systems, and is not intended to be exhaustive. Additional context may become apparent upon review of one or more of the various non-limiting embodiments of the following detailed description.

SUMMARY

The following presents a simplified summary to provide a basic understanding of some aspects of the subject disclosure. This summary is not an extensive overview of the disclosed subject matter. It is not intended to identify key or critical elements of the disclosed subject matter, nor is it intended to delineate the scope of the subject disclosure or the claims. Its sole purpose is to present some concepts of the disclosed subject matter in a simplified form as a prelude to the more detailed description presented later.

A mechanism is described herein that can facilitate mapping data between different hierarchies within an industrial automation system. The different hierarchies each include instances of the same data, but arranged in different structural organizations. Utilizing the mechanism, when instance of data in one hierarchical tree is changed, a corresponding instance of data in the second hierarchical tree can be updated according to the change. Additionally, the mechanism can provide a visualization that can receive both a touch screen input and a traditional mouse/keyboard input to facilitate viewing the various hierarchies and/or editing instances of data within the various hierarchies.

In a non-limiting embodiment of the subject disclosure, a system is described that can employ a mechanism to map between different heirarchical trees within an industrial automation system. The system includes a memory that stores instructions and a processor that executes or facilitates execution of the instructions. Upon execution, the instructions can cause the system to at least: locate a first instance of data within a first hierarchical tree and map the first instance of the data within the first hierarchical tree to a second instance of the data within a second hierarchical tree. The first hierarchical tree and the second hierarchical tree include instances of the same data arranged in different structural organizations.

In another non-limiting embodiment, a method is described that can facilitate mapping between different industrial hierarchies. The method includes, locating, by a system comprising a processor, an instance of data within a first hierarchy. Also included in the method is mapping, by the system, the instance of the data within the first hierarchy to another instance of the data within a second hierarchy. Data represented by the instance of the data within the first hierarchy and the instance of the data within the second hierarchy is related to an entity within an industrial automation system.

In a further non-limiting embodiment, a computer-readable storage medium is described. The computer-readable storage medium has computer-executable instructions stored thereon that, in response to execution by a computing device comprising a processor, cause a computing device to perform operations. The operations include: mapping an instance of data at a logical location within a first hierarchical tree to an instance of the data at a physical location within a second hierarchical tree and generating a display of the first hierarchical tree or the second hierarchical tree. The logical location is different from the physical location.

The following description and the annexed drawings set forth in detail certain illustrative aspects of the disclosed subject matter. These aspects are indicative, however, of a few of the various ways in which the principles of the innovation may be employed. The disclosed subject matter is intended to include all such aspects and their equivalents. Other advantages and distinctive features of the disclosed subject matter will become apparent from the following detailed description of the innovation when considered in conjunction with the drawings.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
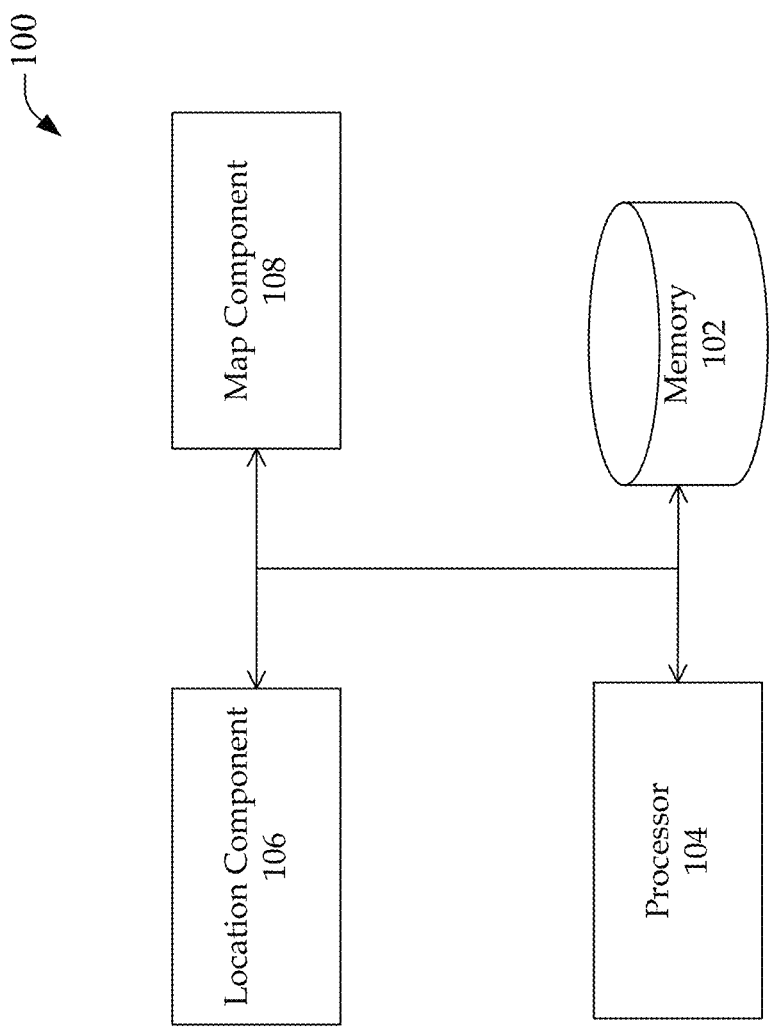
FIG. 1 is a schematic illustration of a system that can facilitate mapping between different hierarchical data structures, according to an embodiment of the subject disclosure.

In the following description, numerous specific details are set forth to provide a thorough understanding of the embodiments of the subject disclosure. One skilled in the relevant art will recognize, however, that the embodiments described herein can be practiced without one or more of the specific details, or with other methods, components, materials, etc. In other instances, well-known structures, materials, or operations are not shown or described in detail to avoid obscuring certain aspects.

According to an aspect of the subject disclosure, described herein is a mechanism that can facilitate mapping between different hierarchies within an industrial automation system. The different hierarchies generally store instances of the same data or information within different structural organizations. The data or information is related to an entity or an aspect of the control system or underlying industrial process.

When used herein, the term "industrial automation system" generally refers to any system that can be used to facilitate automation of an industrial process. An industrial automation system can also be referred to as an "industrial automation environment" or any similar terms. The industrial automation system includes one or more "control systems" that can control an entity or a process within the industrial automation systems. The control systems can employ one or more "industrial controllers" to control the entity or the process. An industrial controller is a device that includes a memory and a processor and can facilitate control of the entity or the process. Examples of industrial controllers include programmable logic controllers, programmable automation controllers, or any other hardware machine that can facilitate industrial control. An "entity" within an industrial automation system generally refers to any hardware device, part of a hardware device, or combination of hardware devices that can be utilized as part of an industrial process.

An industrial automation system can organize data or information related to any aspect of the industrial process in any number of organizational hierarchies. The organizational hierarchies can simplify the design of an industrial automation systems for designers of industrial automation systems (e.g., designers of control programs within the industrial automation systems). The industrial automation system can store instances of data or information in any number of organizational hierarchical trees. Common examples of organizational hierarchies utilized within an industrial automation system include a logical hierarchy, a physical hierarchy, a control hierarchy and a network hierarchy. However, the different types of hierarchies keep expanding just in case the designer may someday find a different type of hierarchy useful. However, the numerous hierarchies are often hard to manage together such that, although the numerous hierarchies are intended to help the designer, the hierarchies may actually confuse the designer who might feel surrounded by the numerous hierarchies.

Hierarchies are needed within an industrial automation system, most generally, to find data or information that is intended to be manipulated in the design of an industrial automation system. The hierarchies provide a high level view of the organization of different data and content within the industrial automation system. Accordingly, hierarchies can facilitate navigation to a location of certain data or information at the time the data or information is needed. The term hierarchy is used interchangeably herein with the terms "hierarchical tree," "tree structure," "organizational hierarchy," or similar terms.

Hierarchies can generally reference content (data or information) from one part of the industrial automation system to another. For example, a library hierarchy can be used to provide data or information that can be utilized to create various programs, visualizations, or the like used within the industrial automation system wherein the programs and visualizations are organized in a logical hierarchy. In another example, programs and visualizations that utilize data that is organized according to a logical hierarchy can be bound to a certain device, and this binding can be made in accordance with a physical hierarchy. As a further example, the programs and visualizations (both organized according to the logical hierarchy or bound to a device according to a physical hierarchy) can be stored within a library hierarchy to facilitate reuse. Additionally, in another example, data or information can be produced or consumed from a single hierarchy (such as a physical hierarchy). In other words, the instances of data in different hierarchies relate to the same data representing different namespaces.

Referring now to FIG. 1, illustrated is a schematic illustration of a system 100 that can facilitate mapping between different hierarchical data structures. System 100 can generalize the numerous hierarchies utilized within the industrial automation system into an easy way to map one tree into another tree. The mapping can facilitate the use of a single interface in the design of industrial automation systems. System 100 can facilitate the design of the industrial automation system via both runtime/touch devices and traditional desktop devices that utilize a mouse and a keyboard due to the single interface. Examples of runtime/touch devices include tablet computers, smart phones, panel devices, and the like.

System 100 includes a memory 102 that can store instructions, components, or the like. System 100 also includes a processor 104 that can execute or facilitate execution of the instructions, components, or the like to facilitate the performance of various operations associated with the instructions, components, or the like. The memory 102 and the processor 104 are both hardware devices that can be utilized within an industrial automation system. Memory 102 and processor 104 can be part of a single device within the industrial automation system or distributed through different devices within the industrial automation system.

The memory 102 can store various components, whose execution can be facilitated by the processor 104. The components include at least a location component 106 and a map component 108. The location component 106 can facilitate location of an instance of data within a first hierarchical tree. The map component 108 can map the instance of the data within the first hierarchical tree to an instance of the data within a second hierarchical tree such that the first hierarchical tree and the second hierarchical tree comprise the same data arranged in different structural organizations.

System 100 can be utilized to simplify the design of a control program within an industrial automation system. One example is that the location of a device is different in different hierarchies. For example, the device can be located under one entity in a first hierarchical structure and another entity in a second hierarchical structure.

A simple example of the device within the industrial automation system is a valve. In a logical hierarchy, the valve can be located under a tank. However, control of the valve can be implemented via an industrial controller. In design of the industrial automation system, the valve may be missing from the control (or physical) hierarchy, but present in the logical hierarchy. System 100 allows for the valve to be mapped from a location below the pump in the logical hierarchy to a location below the controller in the control (or physical) hierarchy.

The location component 106 can locate the valve in the logical hierarchical tree, and the mapping component 108 can map the instance of the valve in the logical hierarchical tree to a location in the control (or physical) hierarchical tree under the industrial controller. After the mapping, the valve remains logically under the tank, but is now physically located under the controller.

The mapping can be facilitated via a visualization. The visualization can include one or more hierarchies such that the mapping can be accomplished via a touch screen input or a mouse/keyboard input. This mapping can facilitate the design of the industrial automation system.

Figure 2:
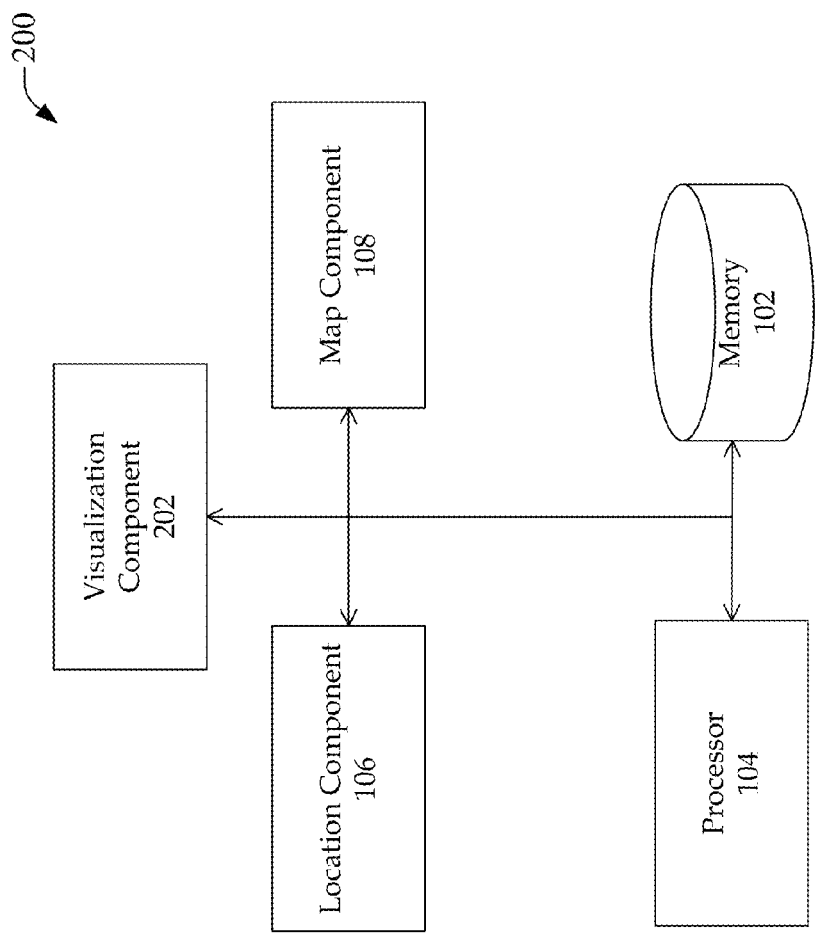
FIG. 2 is a schematic illustration of a system that can facilitate a display of data in different hierarchical data structures, according to an embodiment of the subject disclosure.

FIG. 2 shows a schematic illustration of a system 200 that can facilitate a display of data in different hierarchical data structures. The display of the different tree structures can facilitate the mapping of the data between different hierarchical structures. The data in the different hierarchical structures can be located under different entities within the industrial automation system in different hierarchical structures.

System 200 includes a memory 202 that can store instructions, components, or the like. System 200 also includes a processor 204 that can execute or facilitate execution of the instructions, components, or the like to facilitate the performance of various operations associated with the instructions, components, or the like. The memory 202 and the processor 204 are both hardware devices that can be utilized within an industrial automation system. Memory 202 and processor 204 can be part of a single device within the industrial automation system or distributed through different devices within the industrial automation system.

The memory 202 can store various components, whose execution can be facilitated by the processor 204. The components include at least a location component 106, a map component 108 and a visualization component 202. The visualization component 202 can facilitate the display of a first hierarchy and a second hierarchy. The display can be, for example, within a visualization or a visualization program. The visualization component 202 can facilitate the display of any number of hierarchies, limited only by the area on an electronic device devoted to the display (e.g., a monitor size, a display area on a tablet device, a display area on a panel device, or the like).

One example of a type of visualization display that can be produced by the visualization component 202 is a tabbed document interface. Within the tabbed document interface, the different hierarchies can be displayed in connection with different tabs. For example, the first hierarchy can be displayed in connection with a first tab of the tabbed document interface and the second hierarchy can be displayed in connection with a second tab of the tabbed document interface. However, it will be understood that the visualization display can be any type of visualization display that can facilitate the actions of the location component 106 and/or the map component 108.

The location component 106 can use the display of the hierarchies to facilitate location of an instance of data within a first hierarchical tree. Upon location of the instance of the data within the first hierarchical tree, the map component 108 can enable the instance of the data within the first hierarchical tree to a location in the second (or subsequent) hierarchical tree such that the first hierarchical tree and the second hierarchical tree comprise the same data arranged in different structural organizations. The instances of the data in the different hierarchies represent the same data located in different hierarchical structures representing different namespaces.

As described above, a simple example usage of system 200 is with regard to a valve used within an industrial automation system. The visualization component 202 of system 200 can display a visualization of the logical hierarchy. In the logical hierarchy, the valve is located under the associated pump. The visualization component 202 can also display a visualization of the control (or physical) hierarchy where the valve may not be listed.

The location component 106 can facilitate location of the valve within the logical hierarchy (under the associated pump). The location component 106 can facilitate location of the valve based on a user input (e.g., a selection of the valve from the displayed hierarchy). The user input can be from a touch screen, a keyboard, a mouse, or any other type of input device. However, the location component 106 can also facilitate location of the valve without the need of a user input (e.g., by any type of artificial intelligence technique). In other words, the location component 106 can provide for an automated location of the valve.

After the valve is located in the logical hierarchy, the map component 108 can facilitate mapping the valve to a location in the control (or physical) hierarchy. For example, the valve can be located under an industrial controller in the control (or physical) hierarchy because the industrial controller is actually the device that provides automated control of the valve in the industrial automation system. The map component 108 ensures that the instance of the data in the control (or physical) hierarchy matches the instance of the data in the logical hierarchy.

The map component 108 can facilitate mapping the valve to a location in the control (or physical) hierarchy in a number of ways. In an embodiment, the map component 108 can facilitate the mapping based on an input related to the visualization. For example, the input can be a selection of the controller as the location for the valve. The user input can be from a touch screen, a keyboard, a mouse, or any other type of input device. The map component 108 can also map the data regarding the valve to the location in the control (or physical) hierarchy without the need for a user input (e.g., by any type of artificial intelligence technique). In other words, the map component 108 can provide for an automated mapping of the data related to the valve.

Figure 3:
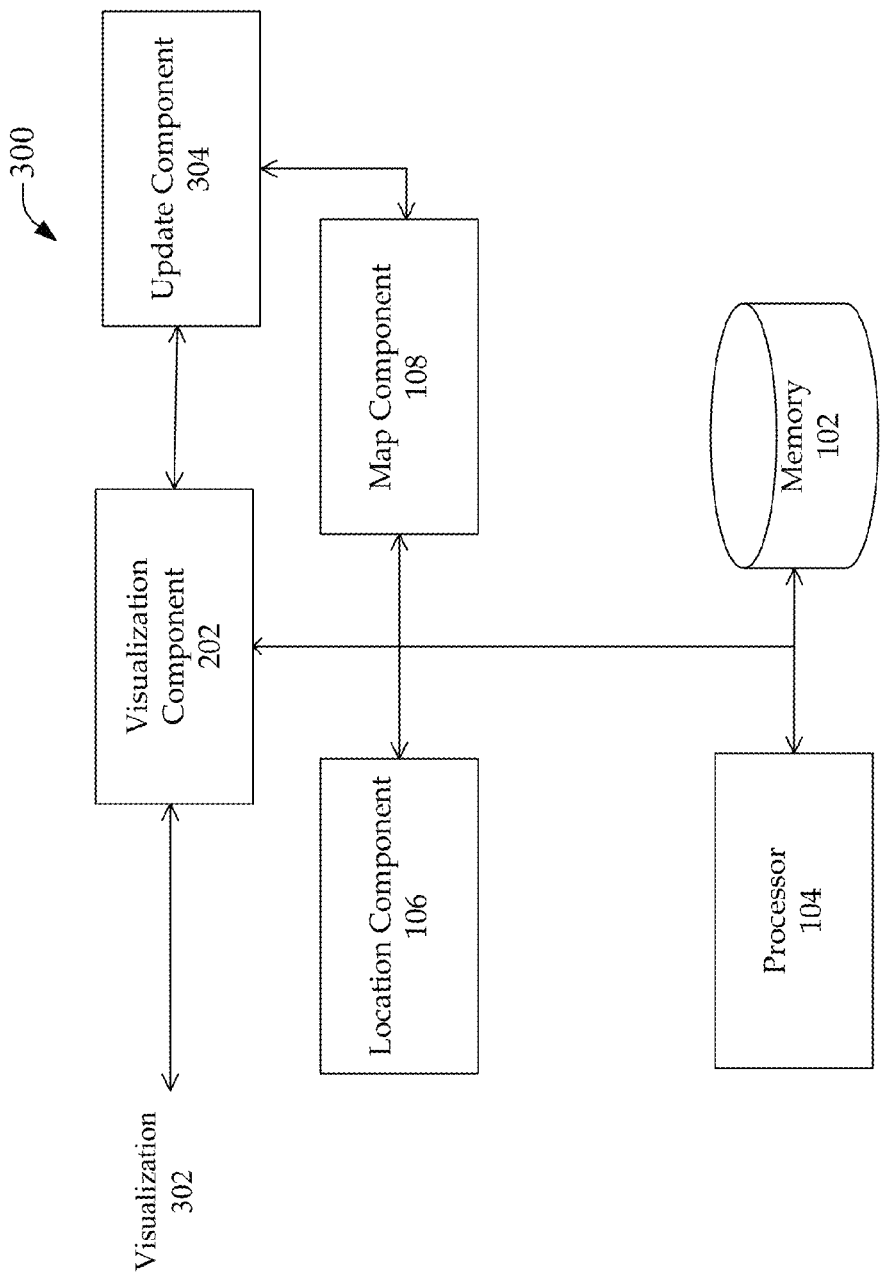
FIG. 3 is a schematic illustration of a system that can facilitate updating a data value within hierarchical data structures, according to an embodiment of the subject disclosure.

The mapped instances of the data can be updated to ensure that the instances of the data refer to the same data within the industrial automation system. Referring now to FIG. 3, illustrated is a schematic illustration of a system 300 that can facilitate updating a data value within hierarchical data structures. In other words, system 300 facilitates the synchronization of instances of data within different hierarchical trees.

System 300 includes a memory 302 that can store instructions, components, or the like. System 300 also includes a processor 304 that can execute or facilitate execution of the instructions, components, or the like to facilitate the performance of various operations associated with the instructions, components, or the like. The memory 302 and the processor 304 are both hardware devices that can be utilized within an industrial automation system. Memory 302 and processor 304 can be part of a single device within the industrial automation system or distributed through different devices within the industrial automation system.

The memory 302 can store various components, whose execution can be facilitated by the processor 304. The components include at least a location component 106, a map component 108, a visualization component 202 that produces visualization 302, and an update component 304. The visualization component 202 can facilitate the display of a first hierarchy and a second hierarchy within visualization 302. The location component 106 can use the display of the hierarchies to facilitate location of an instance of data within a first hierarchical tree. Upon location of the instance of the data within the first hierarchical tree, the map component 108 can enable the instance of the data within the first hierarchical tree to a location in the second (or subsequent) hierarchical tree such that the first hierarchical tree and the second hierarchical tree comprise the same data arranged in different structural organizations. The instances of the data in the different hierarchies represent the same data located in different hierarchical structures representing different namespaces.

The visualization component 202 can facilitate selection of one of the instances of the data in either one of the hierarchical trees. The selection can be made based on an input from any type of input device, such as a touch screen, a keyboard, a mouse, or the like. The selection can also be made as a part of an automated process (e.g., according to any artificial intelligence technique). The update component 304 can facilitate updating the instance of the data that is selected. For example, in the example used above, the valve in the control (or physical) hierarchy can be selected from the visualization 302. The update component 304 can update the value of the data related to the valve. For example, the update component 304 can update the value of the data related to the valve in response to an input or in an automated process (e.g., according to an artificial intelligence technique). The update component 304 can also facilitate the updating of the instance of the data within the other hierarchy (in the example, the data related to the valve within the logical hierarchy) such that the instances of the data both reflect any change to the data in either of the hierarchies.

FIGS. 4-9 show example visualizations 302 that can be utilized in the mapping of data between different hierarchies. The designs shown in FIGS. 4-9 can facilitate inputs from a touch screen or a traditional keyboard/mouse design. However, the designs of the visualizations 302 shown in FIGS. 4-9 are merely exemplary and by no means exclusive of different designs that can be utilized to accomplish the functions of systems 100-300.

Figure 4:
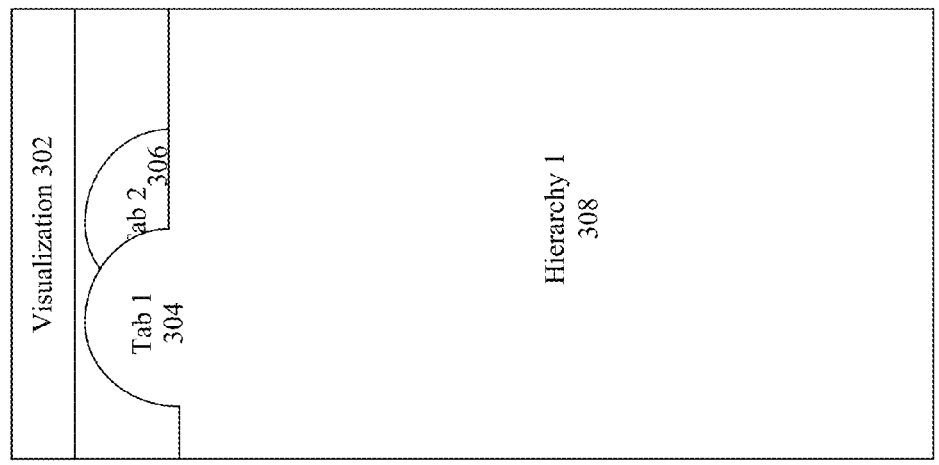
FIG. 4 is a schematic illustration of an example visualization of hierarchical data structures utilizing a tabular organization, according to an embodiment of the subject disclosure.

FIG. 4 is a schematic illustration of an example visualization 302 of hierarchical data structures utilizing a tabular organization. The tabular organization shown in FIG. 4 is but one example an example of a tabbed document interface. The tabular organization illustrates two tabs 304 and 306. Different hierarchies can be displayed within the different tabs 304 and 306. As shown, hierarchy 1 308 is displayed in tab 1 304. A second hierarchy is display in tab 2 306, but cannot be seen in the current display.

Figure 5:
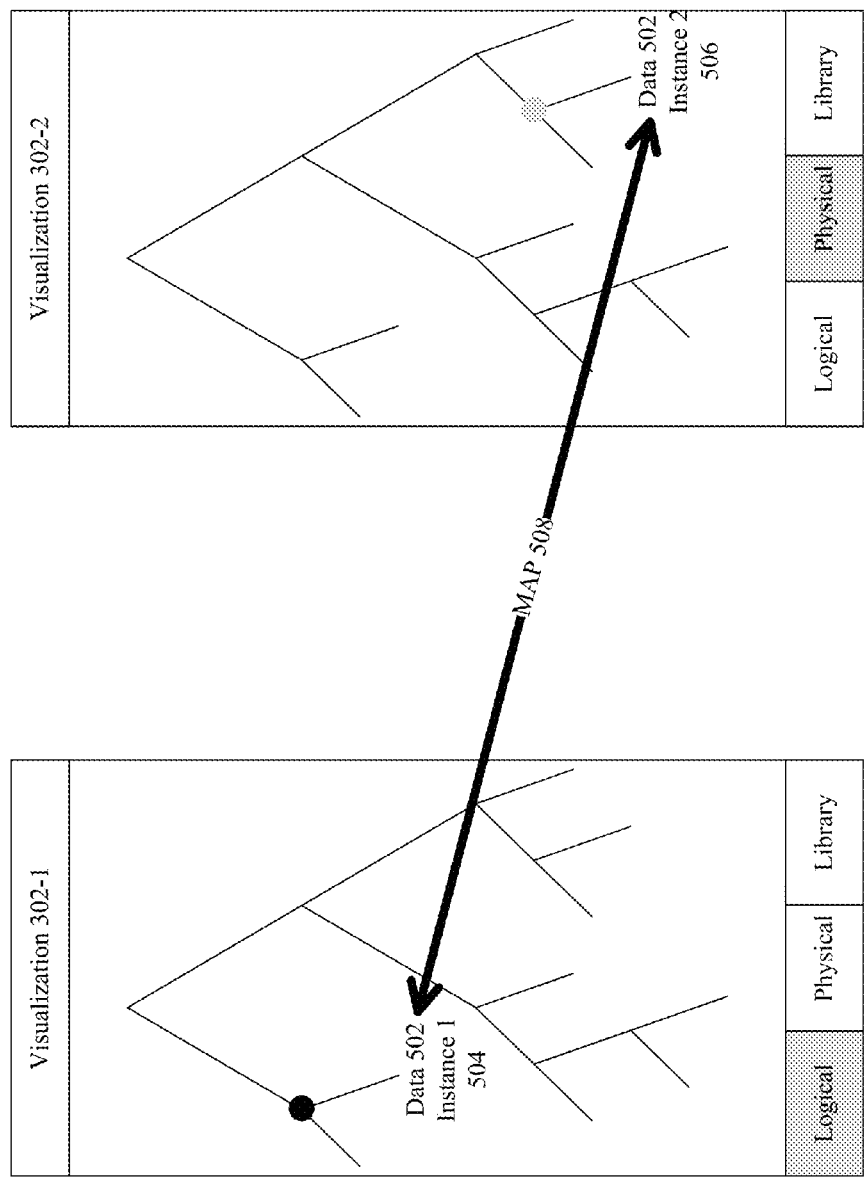
FIG. 5 is a schematic illustration of a mapping between different instances of the same data located in different hierarchical structures, according to an embodiment of the subject disclosure.

FIG. 5 is a schematic illustration of a mapping 508 between different instances 504 and 506 of the same data 502 located in different hierarchical structures. Although the different visualizations 302-1 and 302-2 are shown as separate in FIG. 5, the different visualizations 302-1 and 302-2 can be located together on different sides of a common visualization, can be located in a tabbed interface like FIG. 4 or in any other type of visualization, both together and apart. The logical, physical and library views shown at the bottom of both visualization 302-1 and 302-2 are examples of different types of tabs. The tab that is a shaded color is visualization 302-1 and 302-2 corresponds to the hierarchy that is displayed.

The data 502 instance 1 504 can be located under a certain entity in the logical view. The entity is represented by the black dot in visualization 302-1. The data 502 instance 2 506 can be located under a different entity in the physical view. The entity is represented by the grey dot in visualization 302-2. The visualizations 302-1 and 302-2 can be utilized to facilitate the map 508 between instance 1 504 and instance 2 506 of the data 502 within the different hierarchies (logical and physical). Instance 1 504 and instance 2 506 each represent the same data 502 just in different locations in the different hierarchies representing different namespaces.

Figure 6:
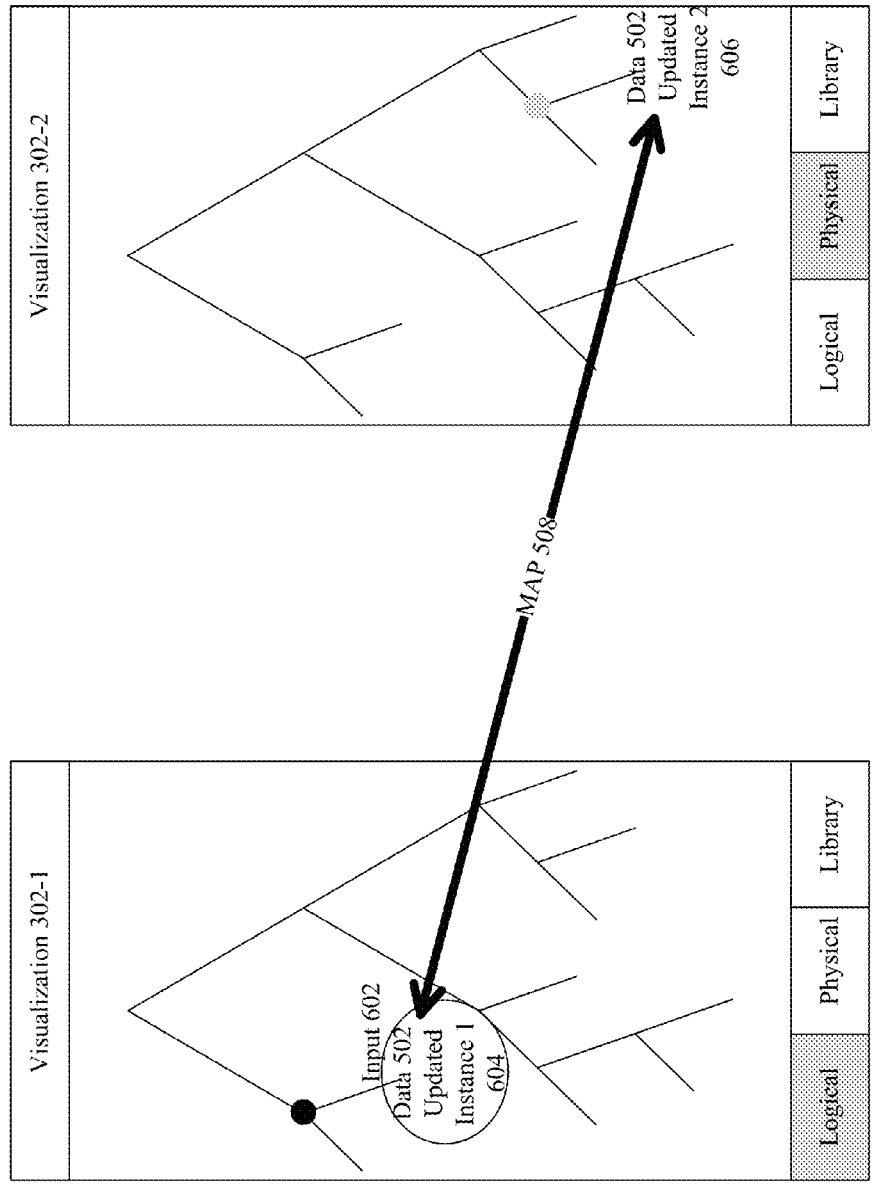
FIG. 6 is a schematic illustration of selecting an instance of data within a hierarchical structure for editing, according to an embodiment of the subject disclosure.

FIG. 6 is a schematic illustration of selecting an instance of data within a hierarchical structure for editing. Although the different visualizations 302-1 and 302-2 are shown as separate in FIG. 6, the different visualizations 302-1 and 302-2 can be located together on different sides of a common visualization, can be located in a tabbed interface like FIG. 4 or in any other type of visualization, both together and apart. The logical, physical and library views shown at the bottom of both visualization 302-1 and 302-2 are examples of different types of tabs. The tab that is a shaded color is visualization 302-1 and 302-2 corresponds to the hierarchy that is displayed.

The different views can be of hierarchies with data 502 instances located under different entities. The entity is represented by the black dot in visualization 302-1 of the logical view. The data 502 instance 2 can be located under a different entity in the physical view. The entity is represented by the grey dot in visualization 302-2. The visualizations 302-1 and 302-2 can be utilized to facilitate the map 508 between data 502 instance 1 and data 502 instance 2 within the different hierarchies (logical and physical). Instance 1 and instance 2 each represent the same data 502 just in different locations in the different hierarchies representing different namespaces.

The data 502 can be updated based on an input 602. The input 602 can be a selection of an instance of the data 502 within one of the hierarchies 302-1. The input 602 can further include change to the data 502. The data 502 instance 1 can be updated to updated instance 1 604 in response to the input 602. Through the map 508, the data 502 instance 2 can be updated to updated instance 2 606 so that the updated data 502 instances 602, 604 match.

Figure 7:
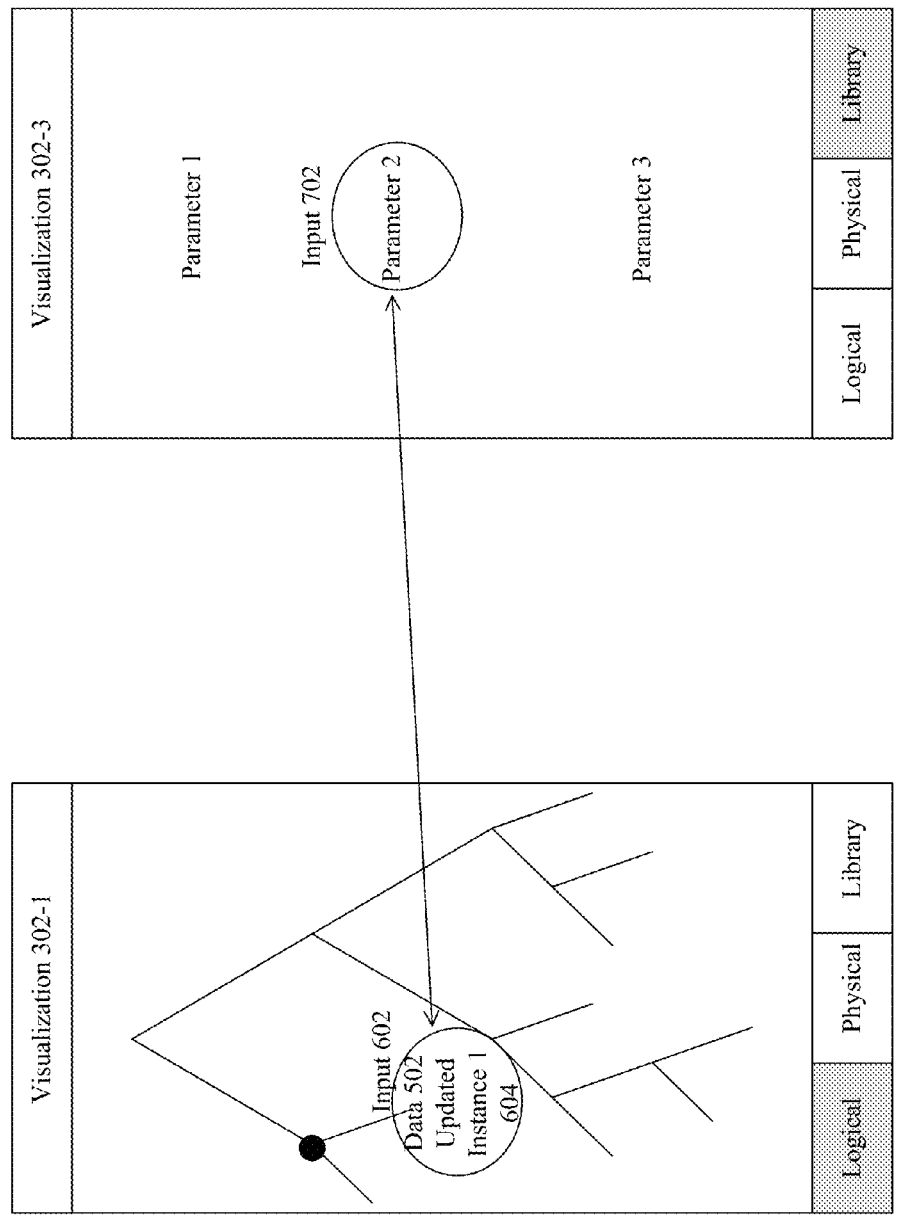
FIG. 7 is a schematic illustration of editing an instance of data within a hierarchical structure utilizing a library, according to an embodiment of the subject disclosure.

FIG. 7 is a schematic illustration of editing an instance of data within a hierarchical structure utilizing a library. Although the different visualizations 302-1 and 302-3 are shown as separate in FIG. 7, the different visualizations 302-1 and 302-3 can be located together on different sides of a common visualization, can be located in a tabbed interface like FIG. 4 or in any other type of visualization, both together and apart. The logical, physical and library views shown at the bottom of both visualization 302-1 and 302-3 are examples of different types of tabs. The tab that is a shaded color is visualization 302-1 and 302-3 corresponds to the hierarchy that is displayed.

The data 502 can be updated based on an input 602. The input 602 can be a selection of an instance of the data 502 within one of the hierarchies 302-1. The input 602 can further include change to the data 502. The data 502 instance 1 can be updated to updated instance 1 604 in response to the input 602. Input 602 can be a selection of a parameter for the data from a library. The parameter can be selected from the library based on input 702. The parameter selected can be used to update data 502 via updated instance 1 604 and perpetuated to the instances stored in the other hierarchies.

Figure 8:
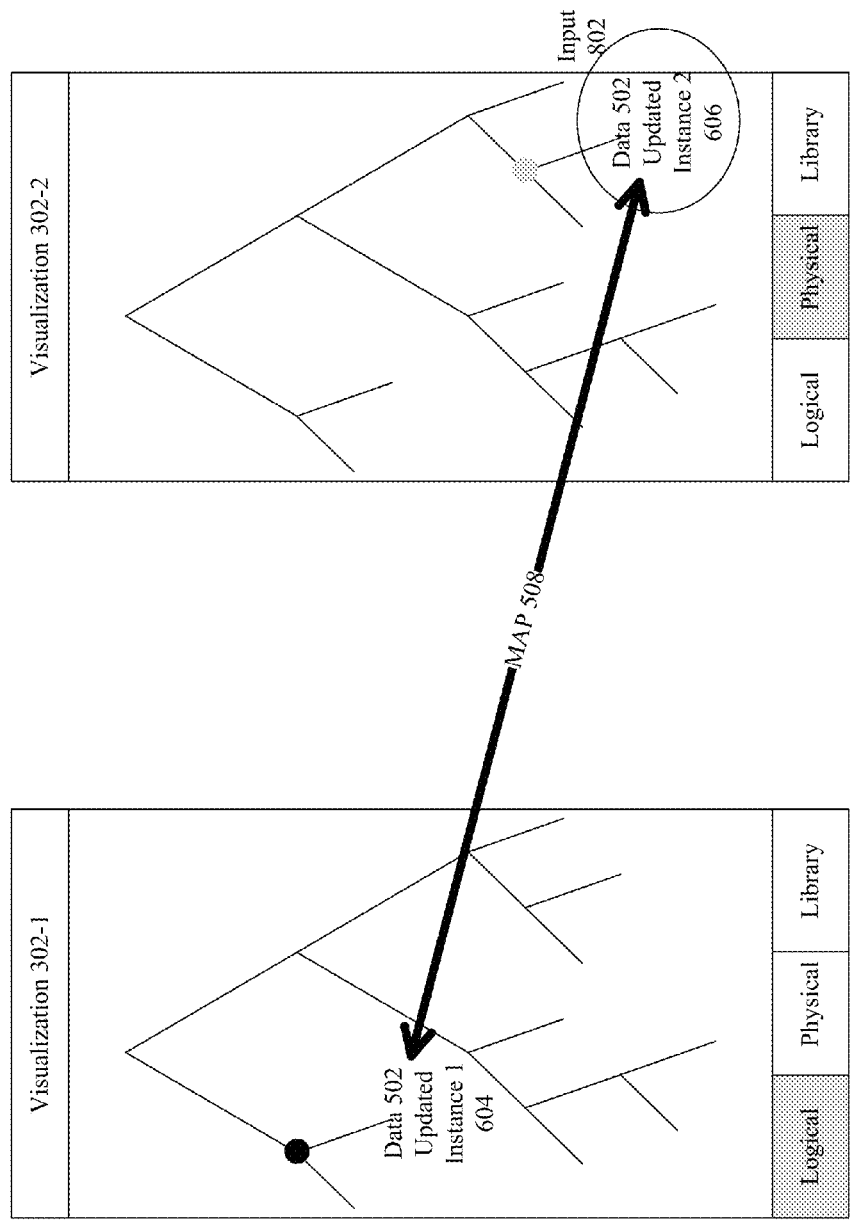
FIG. 8 is a schematic illustration of selecting an instance of data within a different hierarchical structure for editing, according to an embodiment of the subject disclosure.

FIG. 8 is a schematic illustration of selecting an instance of data within a different hierarchical structure for editing. Although the different visualizations 302-1 and 302-2 are shown as separate in FIG. 8, the different visualizations 302-1 and 302-2 can be located together on different sides of a common visualization, can be located in a tabbed interface like FIG. 4 or in any other type of visualization, both together and apart. The logical, physical and library views shown at the bottom of both visualization 302-1 and 302-2 are examples of different types of tabs. The tab that is a shaded color is visualization 302-1 and 302-2 corresponds to the hierarchy that is displayed.

The different views can be of hierarchies with data 502 instances located under different entities. The entity is represented by the black dot in visualization 302-1 of the logical view. The data 502 instance 2 can be located under a different entity in the physical view. The entity is represented by the grey dot in visualization 302-2. The visualizations 302-1 and 302-2 can be utilized to facilitate the map 508 between data 502 instance 1 and data 502 instance 2 within the different hierarchies (logical and physical). Instance 1 and instance 2 each represent the same data 502 just in different locations in the different hierarchies representing different namespaces.

The data 502 can be updated based on an input 802. The input 802 can be a selection of an instance of the data 502 within one of the hierarchies 302-2. The input 802 can further include change to the data 502. The data 502 instance 2 can be updated to updated instance 1 606 in response to the input 802. Through the map 508, the data 502 instance 1 can be updated to updated instance 1 604 so that the updated data 502 instances 602, 604 match.

Figure 9:
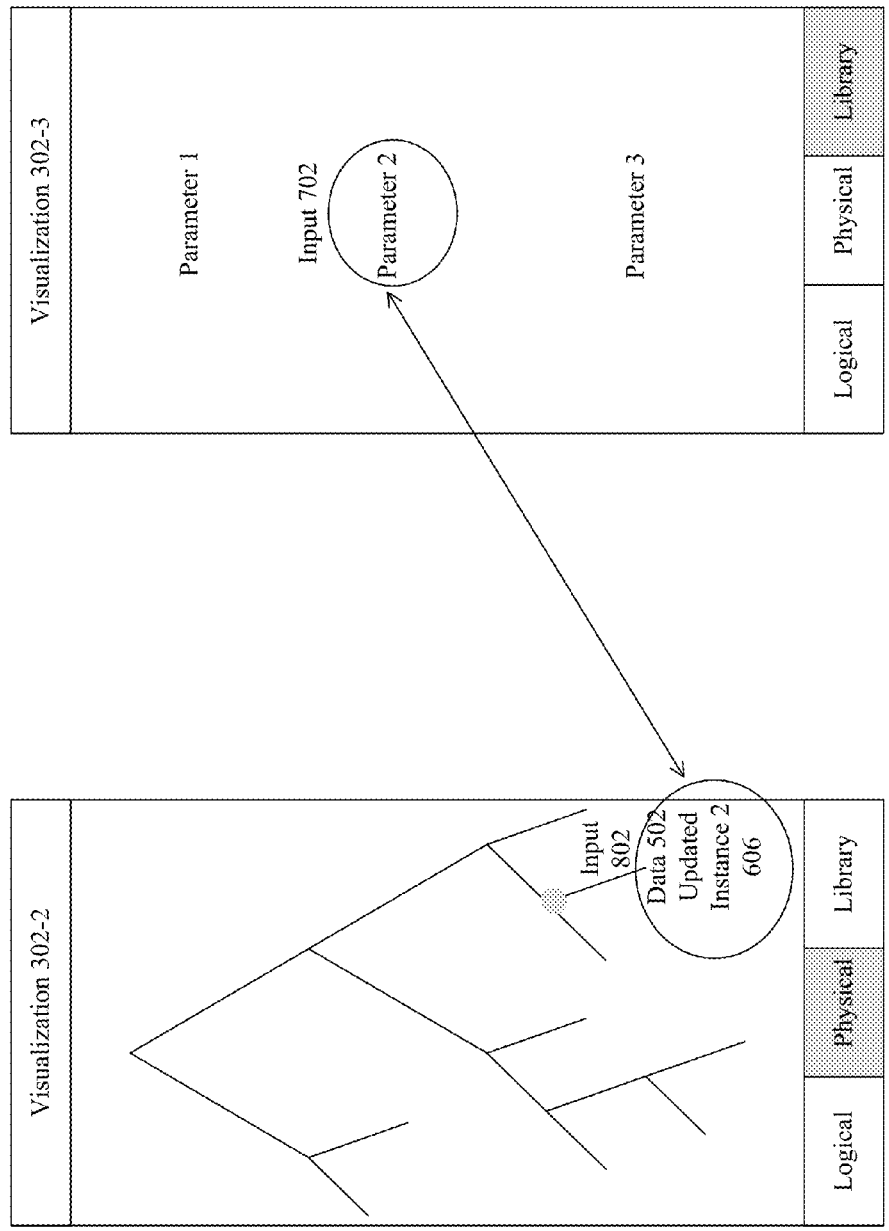
FIG. 9 is a schematic illustration of editing an instance of data within a different hierarchical structure utilizing a library, according to an embodiment of the subject disclosure.

FIG. 9 is a schematic illustration of editing an instance of data within a different hierarchical structure utilizing a library. Although the different visualizations 302-2 and 302-3 are shown as separate in FIG. 9, the different visualizations 302-2 and 302-2 can be located together on different sides of a common visualization, can be located in a tabbed interface like FIG. 4 or in any other type of visualization, both together and apart. The logical, physical and library views shown at the bottom of both visualization 302-2 and 302-2 are examples of different types of tabs. The tab that is a shaded color is visualization 302-2 and 302-2 corresponds to the hierarchy that is displayed.

The data 502 can be updated based on an input 802. The input 802 can be a selection of an instance of the data 502 within one of the hierarchies 302-2. The input 802 can further include change to the data 502. The data 502 instance 2 can be updated to updated instance 2 606 in response to the input 802. Input 802 can be a selection of a parameter for the data from a library. The parameter can be selected from the library based on input 702. The parameter selected can be used to update data 502 via updated instance 2 606 and perpetuated to the instances stored in the other hierarchies.

FIGS. 10-14 show methods illustrated as flow diagrams, in accordance with one or more embodiments of the subject application. For simplicity of explanation, the methods are depicted and described as series of acts. However, the methods are not limited by the acts illustrated and by the order of the acts. For example, acts can occur in various orders and/or concurrently, and with other acts not presented and described herein. Furthermore, not all illustrated acts may be required to implement the methods. The acts of the methods can be performed by a system including a processor.

Additionally, it should be further appreciated that the methods can be implemented on one or more articles of manufacture (e.g., a non-transitory computer-readable storage medium having computer-executable instructions for performing the acts and/or events of the various methods stored thereon) to facilitate transporting and transferring the methods. Non-transitory computer readable media can include, but are not limited to, magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ), and the like. Further yet, two or more of methods can be implemented in combination with each other, to accomplish one or more features or advantages described herein.

Figure 10:
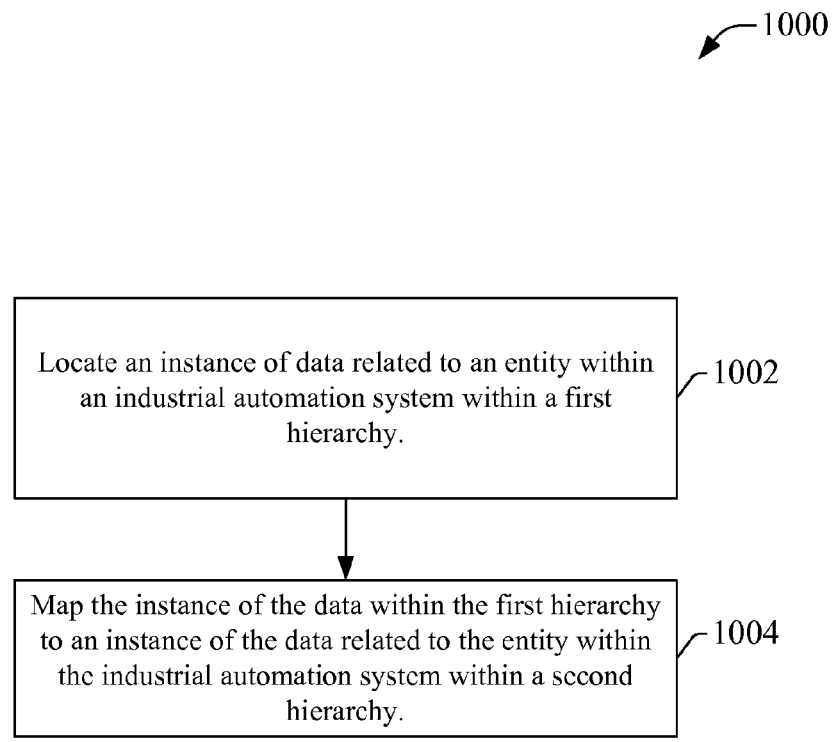
FIG. 10 is a schematic illustration of a process flow diagram illustrating a method that can facilitate mapping between two different hierarchical data structures, according to an embodiment of the subject disclosure.

Referring now to FIG. 10, illustrated is a process flow diagram of a method 1000 that can facilitate mapping between two different hierarchical data structures. By generalizing hierarchical trees, method 1000 provides an easy way to map one tree onto another tree. In other words, method 1000 allows for synchronization of data from one tree to another tree.

At element 1002, an instance of data related to an entity within an industrial automation system within a first hierarchy can be located. At element 1004, the instance of the data within the first hierarchy can be mapped to an instance of the data related to the entity within a second hierarchy. The data represented by the instance of the data within the first hierarchy and instance related to the data within the second hierarchy represent the same data in different hierarchies representing different namespaces. In other words, the hierarchies comprise the same data arranged in different structural organizations.

Method 1000 can be utilized to simplify the design of a control program within an industrial automation system. One example is that the location of a device is different in different hierarchies. For example, the device can be located under one entity in a first hierarchical structure and another entity in a second hierarchical structure.

A simple example of the device within the industrial automation system is a valve. In a logical hierarchy, the valve can be located under a tank. However, control of the valve can be implemented via an industrial controller. In design of the industrial automation system, the valve may be missing from the control (or physical) hierarchy, but present in the logical hierarchy. Method 1000 allows for the valve to be mapped from a location below the pump in the logical hierarchy to a location below the controller in the control (or physical) hierarchy. After the mapping, the valve remains logically under the tank, but is now physically located under the controller.

Figure 11:
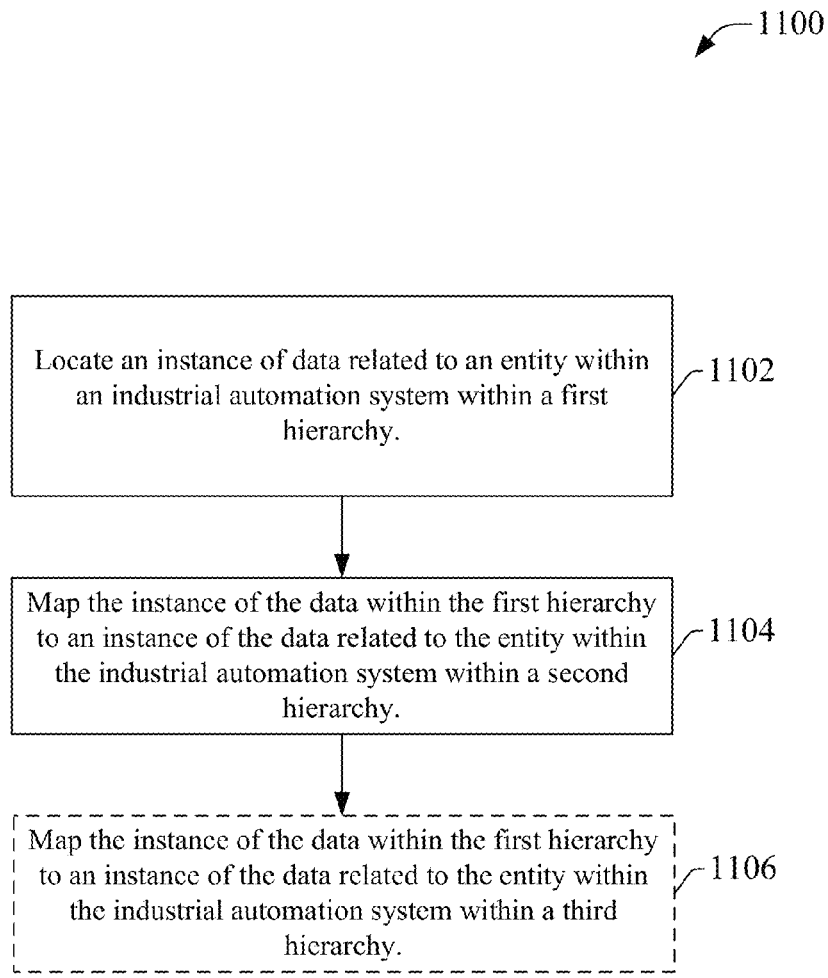
FIG. 11 is a process flow diagram illustrating a method mapping between three different hierarchical data structures, according to an embodiment of the subject disclosure.

Referring now to FIG. 11, illustrated is a process flow diagram of a method 1100 that can facilitate mapping between three or more different hierarchical data structures. At element 1102, an instance of data related to an entity within an industrial automation system within a first hierarchy can be located. At element 1104, the instance of the data within the first hierarchy can be mapped to an instance of the data related to the entity within a second hierarchy. Optionally, at element 1106, the instance of the data related to the entity within the first hierarchy or the instance of the data related to the entity within the second hierarchy can be mapped to an instance of the data related to the entity within a third hierarchy. The mapping can be repeated for further hierarchies (e.g., hierarchies 2-N, where N is the maximum number of hierarchies permitted by memory capabilities of the industrial automation system).

All of the hierarchies comprise the same data arranged in different structural organizations. In other words, the data represented by the different instances of the data represents the same data in different hierarchies representing different namespaces.

Figure 12:
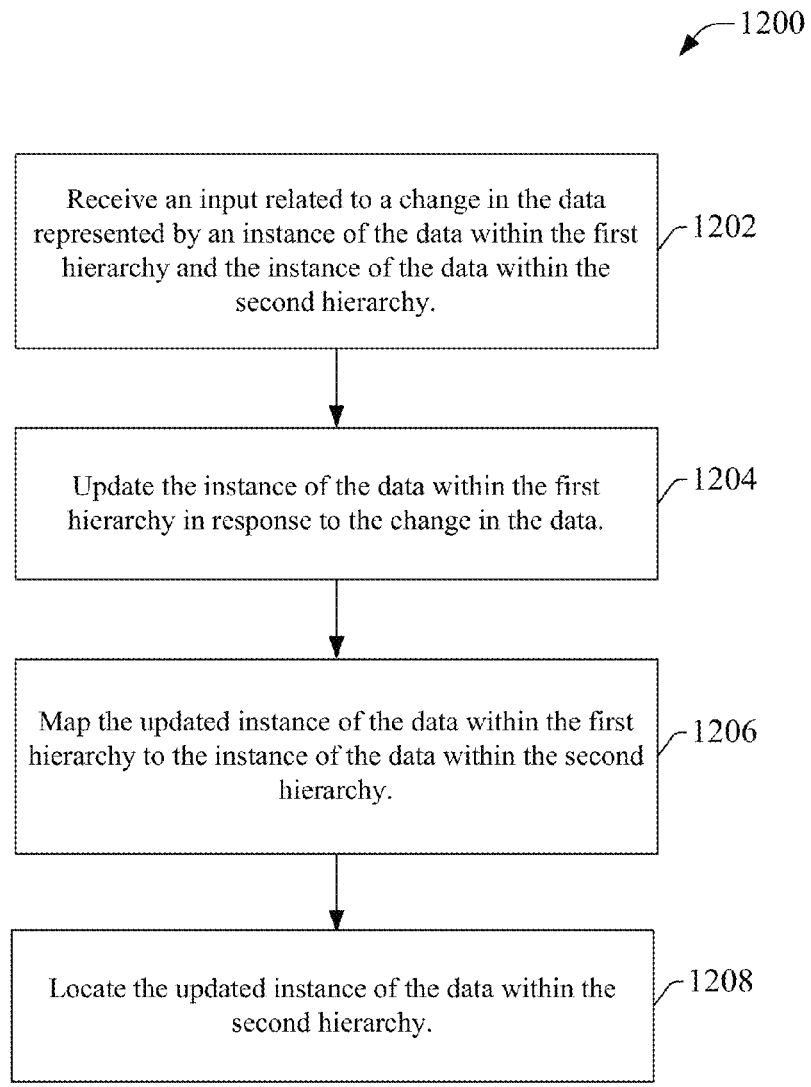
FIG. 12 is a process flow diagram illustrating a method that can facilitate updating data values within different hierarchies, according to an embodiment of the subject disclosure.

FIG. 12 is a process flow diagram illustrating a method 1200 that can facilitate updating data values within different hierarchies. At element 1202, an input related to a change in data can be received. The data can be represented by an instance of the data within the first hierarchy and an instance of the data within the second hierarchy (as well as any number of other instances of the data limited only by the number of hierarchies that exist). At element 1204, an instance of the data within the first hierarchy can be updated in response to the change in the data. At element 1206, the updated instance of the data within the first hierarchy can be mapped to the instance of the data within the second hierarchy. This mapping can be repeated for any number of hierarchies. At element 1208, the updated instance of the data within the second hierarchy can be located.

Figure 13:
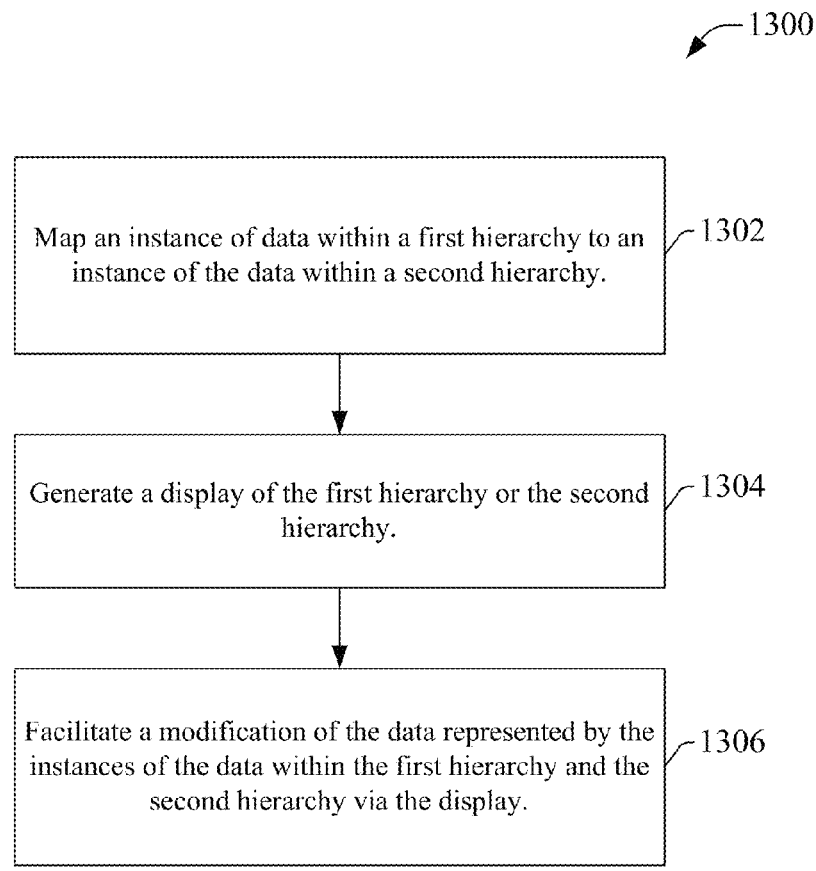
FIG. 13 is a process flow diagram illustrating a method that can facilitate modifying data values stored in different hierarchies according to a display, according to an embodiment of the subject disclosure.

FIG. 13 is a process flow diagram illustrating a method 1300 that can facilitate modifying data values stored in different hierarchies according to a display. At element 1302, an instance of data within a first hierarchy can be mapped to an instance of the data within the second hierarchy.

At element 1304, a display of the first hierarchy or the second hierarchy can be generated. The display can be any type of display that can facilitate display of both the first hierarchy and the second hierarchy. For example, the display can include tabs that can be connected to the different hierarchies such that upon selection of one tab, the first hierarchy is displayed and upon selection of another tab, the second hierarchy is displayed.

At element 1306, a modification of the data represented by the instances of the data within the first hierarchy and the second hierarchy via the display can be facilitated. The modification can be a modification of the data represented by both instances in the two hierarchies or of either one of the instances. The modification is perpetuated through the mapping such that the data and the instances of the data all represent the same value.

Figure 14:
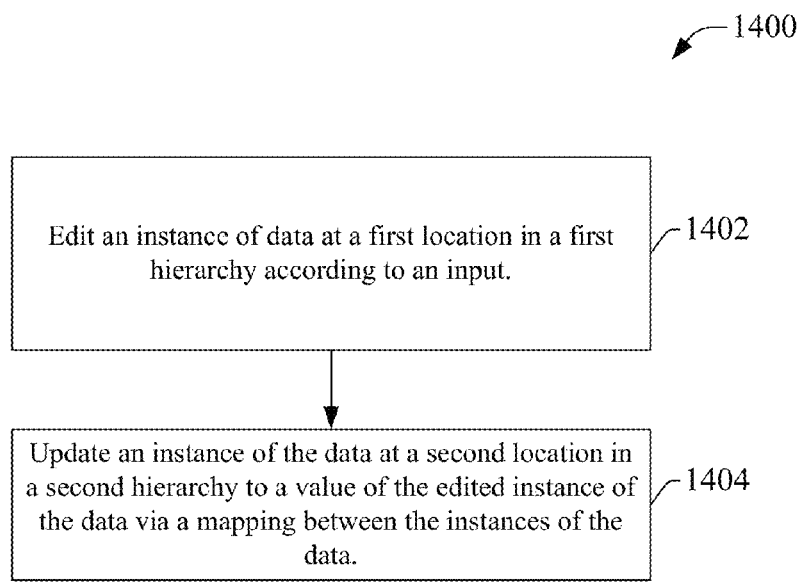
FIG. 14 is a process flow diagram illustrating a method that can facilitate editing instances of data stored in different hierarchical data models, according to an embodiment of the subject disclosure.

FIG. 14 is a process flow diagram illustrating a method 1400 that can facilitate editing instances of data stored in different hierarchical data models. At element 1402, an instance of data at a first located in a first hierarchy can be edited according to an input. At element 1404, an instance of the data at a second location in a second hierarchy can be updated to a value of the edited instance of the data via a mapping between the instances of the data. The updated instance of the data in the second hierarchy can be located in the second hierarchy. The updated instance of the data in the second hierarchy and the edited instance of the data in the first hierarchy represent the same value of the data at least due to the mapping.

Figure 15:
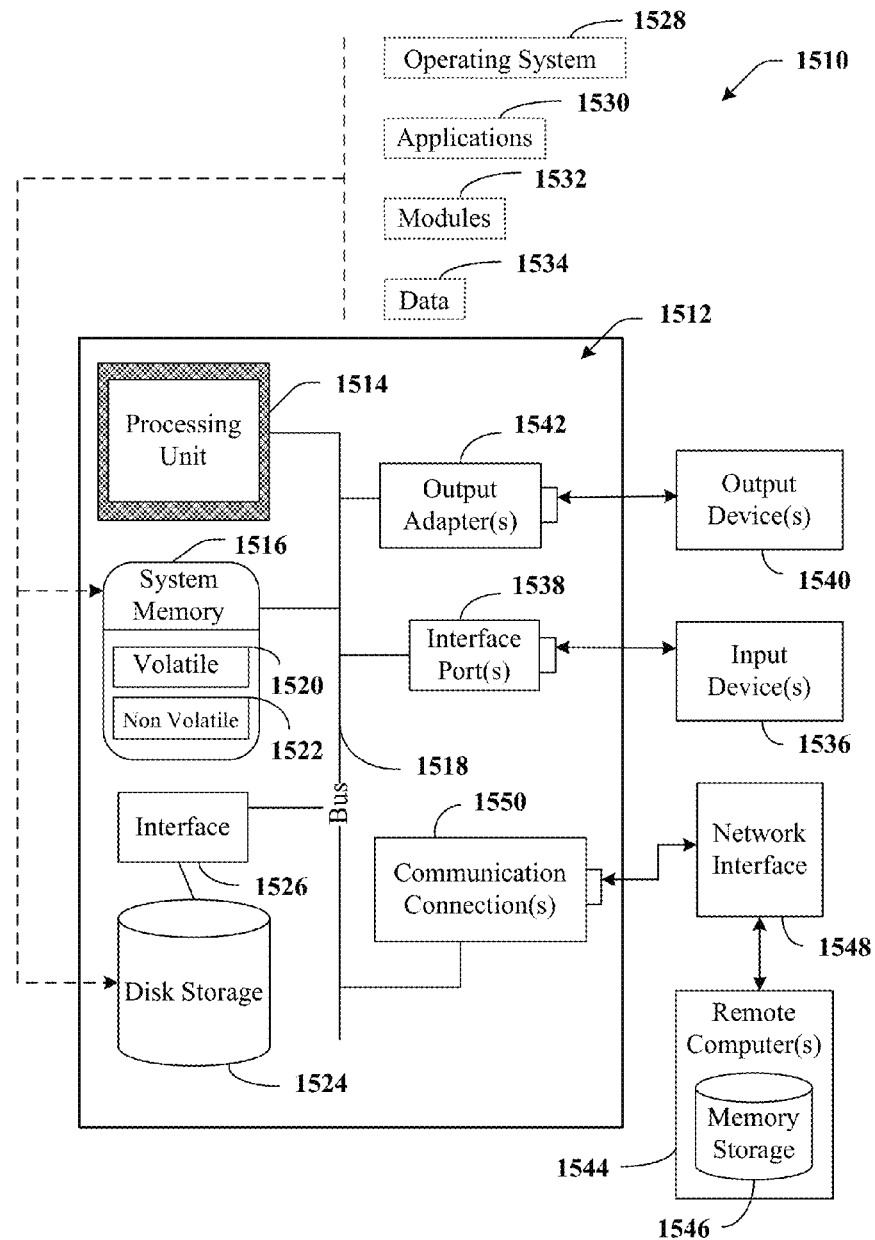
FIG. 15 illustrates an example computing environment in which any one of the various embodiments described herein can be implemented.
Figure 16:
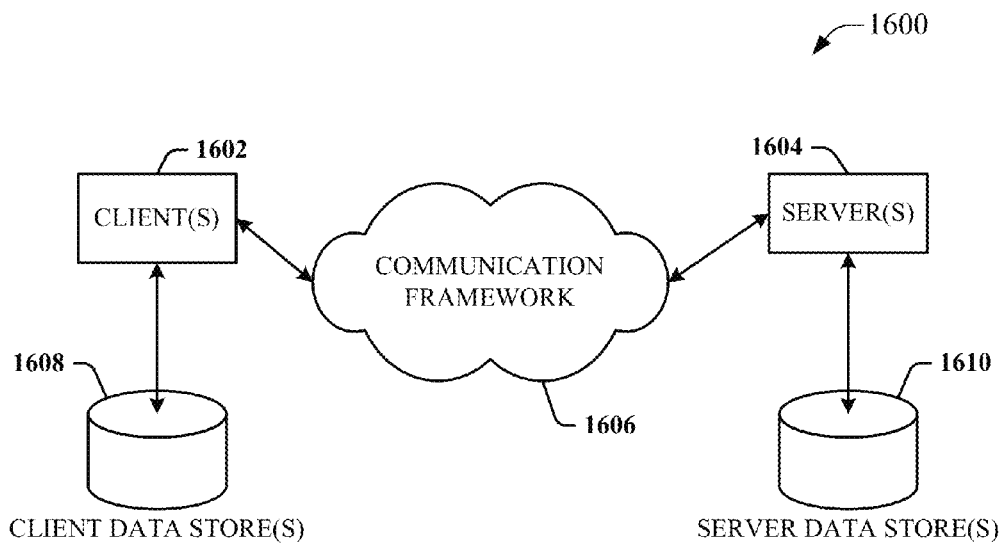
FIG. 16 illustrates an example of a computer network in which any one of the various embodiments described herein can be implemented.

In order to provide a context for the various aspects of the disclosed subject matter, FIGS. 15 and 16, as well as the following discussion, are intended to provide a brief, general description of a suitable environment in which the various aspects of the disclosed subject matter can be implemented. The different hierarchical trees described herein can be implemented within an industrial automation system to facilitate industrial automation applications.

Industrial automation systems, such as industrial control systems and industrial automation environments, in which various aspects set forth in the subject specification can be carried out, can include computer or network components such as servers, clients, programmable logic controllers (PLCs), automation controllers, communications modules, mobile computers, wireless components, control components and so forth which are capable of interacting across a network. Computers and servers include one or more processors—electronic integrated circuits that perform logic operations employing electric signals—configured to execute instructions stored in media such as random access memory (RAM), read only memory (ROM), a hard drives, as well as removable memory devices, which can include memory sticks, memory cards, flash drives, external hard drives, and so on. As described herein, the applications and processes are generally discrete applications that execute on a single machine within an industrial automation system. However, the discrete applications can be distributed through the industrial automation system.

Similarly, the term PLC or automation controller (PAC) as used herein can include functionality that can be shared across multiple components, systems, and/or networks. As an example, one or more PLCs or PACs can communicate and cooperate with various network devices across the network. This can include substantially any type of control, communications module, computer, Input/Output (I/O) device, sensor, actuator, and human machine interface (HMI) that communicate via the network, which includes control, automation, and/or public networks. The PLC or automation controller can also communicate to and control various other devices such as I/O modules including analog, digital, programmed/intelligent I/O modules, other programmable controllers, communications modules, sensors, actuators, output devices, and the like.

The network can include public networks such as the internet, intranets, and automation networks such as Common Industrial Protocol (CIP) networks including DeviceNet, ControlNet, and EtherNet/IP. Other networks include Ethernet, DH/DH+, Remote I/O, Fieldbus, Modbus, Profibus, CAN, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

With reference to FIG. 15, an example computing environment 1510 that can be utilized in an industrial automation system to facilitate implementing various aspects of the aforementioned subject matter. The environment 1510 includes a computer 1512. The computer 1512 includes a processing unit 1514, a system memory 1516, and a system bus 1518. The system bus 1518 couples system components including, but not limited to, the system memory 1516 to the processing unit 1514. The processing unit 1514 can be any of various available processors. Multi-core microprocessors and other multiprocessor architectures also can be employed as the processing unit 1514.

The system bus 1518 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1516 includes volatile memory 1520 and nonvolatile memory 1522. The basic input/output system (BIOS), containing the basic routines to transfer information between elements within the computer 1512, such as during start-up, is stored in nonvolatile memory 1522. By way of illustration, and not limitation, nonvolatile memory 1522 can include read only memory (ROM), programmable ROM (PROM), electrically programmable ROM (EPROM), electrically erasable PROM (EEPROM), or flash memory. Volatile memory 1520 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1512 also includes removable/non-removable, volatile/non-volatile computer storage media. FIG. 15 illustrates, for example a disk storage 1524. Disk storage 1524 generally includes any computer recording media that includes a recording media to retain digital data. Disk storage 1524 includes, but is not limited to, devices like a magnetic disk drive, floppy disk drive, tape drive, magnetic drive, Jaz drive, Zip drive, LS-100 drive, solid state semiconductor drive, flash memory card, or memory stick. In addition, disk storage 1524 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1524 to the system bus 1518, a removable or non-removable interface is typically used such as interface 1526.

It is to be appreciated that FIG. 15 describes software that acts as an intermediary between users and the basic computer resources described in suitable operating environment 1510. Such software includes an operating system 1528. Operating system 1528, which can be stored on disk storage 1524, acts to control and allocate resources of the computer system 1512. System applications 1530 take advantage of the management of resources by operating system 1528 through program modules 1532 and program data 1534 stored either in system memory 1516 or on disk storage 1524. It is to be appreciated that one or more embodiments of the subject disclosure can be implemented with various operating systems or combinations of operating systems.

A user enters commands or information into the computer 1512 through input device(s) 1536. Input devices 1536 include, but are not limited to, a pointing device such as a mouse, trackball, stylus, touch pad, keyboard, a touch screen, microphone, joystick, game pad, satellite dish, scanner, TV tuner card, digital camera, digital video camera, web camera, and the like. These and other input devices connect to the processing unit 1514 through the system bus 1518 via interface port(s) 1538. Interface port(s) 1538 include, for example, a serial port, a parallel port, a game port, and a universal serial bus (USB). Output device(s) 1540 use some of the same type of ports as input device(s) 1536. Thus, for example, a USB port may be used to provide input to computer 1512, and to output information from computer 1512 to an output device 1540. Output adapter 1542 is provided to illustrate that there are some output devices 1540 like monitors, speakers, and printers, among other output devices 1540, which require special adapters. The output adapters 1542 include, by way of illustration and not limitation, video and sound cards that provide a means of connection between the output device 1540 and the system bus 1518. It should be noted that other devices and/or systems of devices provide both input and output capabilities such as remote computer(s) 1544.

Computer 1512 can operate in a networked environment using logical connections to one or more remote computers, such as remote computer(s) 1544. The remote computer(s) 1544 can be a personal computer, a server, a router, a network PC, a workstation, a microprocessor based appliance, a peer device or other common network node and the like, and typically includes many or all of the elements described relative to computer 1512. For purposes of brevity, only a memory storage device 1546 is illustrated with remote computer(s) 1544. Remote computer(s) 1544 is logically connected to computer 1512 through a network interface 1548 and then physically connected via communication connection 1550. Network interface 1548 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL). Computer 1510 can also operate in a wireless network (e.g., WIFI).

Communication connection(s) 1550 refers to the hardware/software employed to connect the network interface 1548 to the bus 1518. While communication connection 1550 is shown for illustrative clarity inside computer 1512, it can also be external to computer 1512. The hardware/software necessary for connection to the network interface 1548 includes, for exemplary purposes only, internal and external technologies such as, modems including regular telephone grade modems, cable modems and DSL modems, ISDN adapters, Ethernet cards and wireless modems and other wireless technologies.

FIG. 16 is a schematic block diagram of a sample-computing environment 1600 with which the disclosed subject matter can interact. The system 1600 includes one or more client(s) 1610. The client(s) 1610 can be hardware and/or software (e.g., threads, processes, computing devices). The system 1600 also includes one or more server(s) 1630. The server(s) 1630 can also be hardware and/or software (e.g., threads, processes, computing devices). The servers 1630 can house threads to perform transformations by employing one or more embodiments as described herein, for example. One possible communication between a client 1610 and a server 1630 can be in the form of a data packet adapted to be transmitted between two or more computer processes. The system 1600 includes a communication framework 1650 that can be employed to facilitate communications between the client(s) 1610 and the server(s) 1630. The client(s) 1610 are operably connected to one or more client data store(s) 1660 that can be employed to store information local to the client(s) 1610. Similarly, the server(s) 1630 are operably connected to one or more server data store(s) 1640 that can be employed to store information local to the servers 1630.

The above description of illustrated embodiments, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

As used herein, the word "example" is used herein to mean serving as an example, instance, or illustration. For the avoidance of doubt, the subject matter described herein is not limited by such examples. In addition, any aspect or design described herein as an "example" is not necessarily to be construed as preferred or advantageous over other aspects or designs, nor is it meant to preclude equivalent structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

In this regard, while the described subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims.

What is claimed is:

1. A system, comprising:
    a memory that stores instructions; and
    a processor that executes or facilitates execution of the instructions to at least:
        locate a first instance of data within a first hierarchical tree; and
        map the first instance of the data within the first hierarchical tree to a second instance of the data within a second hierarchical tree, wherein the first instance of the data is same as the second instance of the data, and the first hierarchical tree is arranged in a first structural organization and the second hierarchical tree is arranged in a second structural organization that is different from the first structural organization.

2. The system of claim 1, wherein the processor further executes or facilitates the execution of the instructions to display a visualization comprising the first hierarchical tree and the second hierarchical tree, wherein the visualization facilitates the mapping of the first instance of the data to the second instance of the data.

3. The system of claim 2, wherein the visualization comprises a tabbed document interface, wherein the first hierarchical tree is displayed connected to a first tab of the tabbed document interface and the second hierarchical tree is displayed connected to a second tab of the tabbed document interface.

4. The system of claim 2, wherein the processor further executes or facilitates the execution of the instructions to update the first instance of the data within the first hierarchical tree to an updated first instance of the data via the visualization in response to input information.

5. The system of claim 4, wherein the processor further executes or facilitates the execution of the instructions to update the second instance of the data within the second hierarchical tree to a same value as the updated first instance of the data within the first hierarchical tree.

6. The system of claim 1, wherein the first hierarchical tree comprises a logical hierarchy of an industrial automation system, a physical hierarchy of the industrial automation system, or a control hierarchy of the industrial automation system.

7. The system of claim 6, wherein the second hierarchical tree is different from the first hierarchical tree and comprises the logical hierarchy of the industrial automation system, the physical hierarchy of the industrial automation system, or the control hierarchy of the industrial automation system.

8. The system of claim 1, wherein a set of the data represented by each of the first instance of the data within a logical hierarchy and the second instance of the data within a physical hierarchy is related to a device within an industrial automation system.

9. The system of claim 1, wherein the processor further executes or facilitates the execution to facilitate the first instance of the data within a logical hierarchical tree being mapped to the second instance of the data within a physical hierarchical tree according to input information received via a touch screen, a keyboard, or a mouse.

10. A method, comprising:
    locating, by a system comprising a processor, a first instance of data within a first hierarchy having a first structural organization; and
    mapping, by the system, the first instance of the data within the first hierarchy to a second instance of the data within a second hierarchy having a second structural organization, wherein the first instance of the data within the first hierarchy is same as the second instance of the data within the second hierarchy, and wherein the first instance of the data is related to an entity within an industrial automation system.

11. The method of claim 10, wherein the second instance of the data is related to the entity or is related to another entity within the industrial automation system.

12. The method of claim 10, wherein the first hierarchy comprises one of a logical hierarchy of the industrial automation system, a physical hierarchy of the industrial automation system, or a control hierarchy of the industrial automation system, and the second hierarchy comprises another one of the logical hierarchy, the physical hierarchy, or the control hierarchy.

13. The method of claim 10, further comprising:
receiving, by the system, input information related to a change in a subset of the data represented by the first instance of the data within the first hierarchy and represented by the second instance of the data within the second hierarchy;
updating, by the system, the first instance of the data within the first hierarchy to generate an updated first instance of the data based on the change in the subset of the data;
mapping, by the system, the updated first instance of the data within the first hierarchy to the second instance of the data within the second hierarchy to update the second instance of the data within the second hierarchy to generate an updated second instance of the data; and
locating, by the system, the updated second instance of the data within the second hierarchy.

14. The method of claim 10, further comprising displaying, by the system, a visualization of the first hierarchy and the second hierarchy to facilitate modification of a subset of the data represented by the first instance of the data within the first hierarchy and represented by the second instance of the data within the second hierarchy.

15. The method of claim 14, wherein the visualization comprises a tabbed document interface, wherein the first hierarchy is displayed connected to a first tab of the tabbed document interface and the second hierarchy is displayed connected to a second tab of the tabbed document interface.

16. A non-transitory computer-readable storage medium comprising computer-executable instructions stored thereon that, in response to execution, cause a system comprising a processor to perform operations, comprising:
mapping an instance of data at a logical location within a first hierarchical tree to another instance of the data at a physical location within a second hierarchical tree, wherein the instance of the data and the other instance of the data are a same set of the data; and
generating a display of the first hierarchical tree or the second hierarchical tree, wherein the logical location is different from the physical location.

17. The non-transitory computer-readable storage medium of claim 16, wherein a subset of the data represented by each of the instance of the data within the first hierarchy and the other instance of the data within the second hierarchy is related to a device within an industrial automation system.

18. The non-transitory computer-readable storage medium of claim 16, wherein the display comprises a first tab linked to a first editable visualization of the first hierarchical tree and a second tab linked to a second editable visualization of the second hierarchical tree.

19. The non-transitory computer-readable storage medium of claim 17, wherein the operations further comprise:
editing the instance of the data at the logical location according to input information to generate an edited instance of the data; and
updating the other instance of the data at the physical location to a value of the edited instance of the data via the mapping.

20. The non-transitory computer-readable storage medium of claim 17, wherein the mapping further comprises:
mapping the instance of the data at the logical location associated with a first entity of an industrial automation system within a first hierarchical tree to the other instance of the data at the physical location associated with a second entity of the industrial automation system within a second hierarchical tree.

* * * * *